May 10, 1938.  Y. LION  2,117,031
BRAKE TESTING DEVICE
Filed April 2, 1934
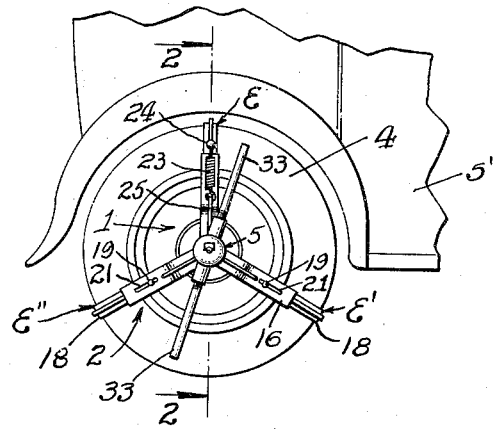
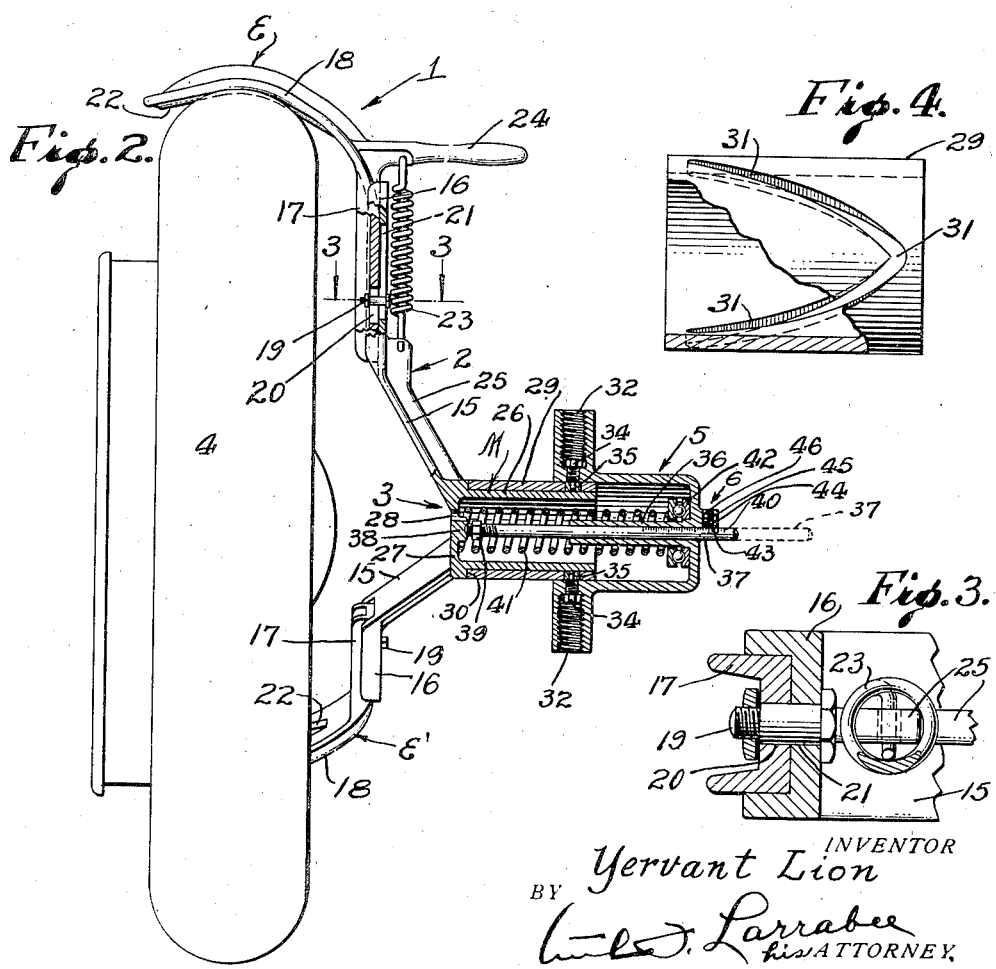
INVENTOR
Yervant Lion
BY
Carl D. Larrabee
his ATTORNEY Patented May 10, 1938

2,117,031

UNITED STATES PATENT OFFICE 2,117,031

BRAKE TESTING DEVICE

Yervant Lion, Fresno, Calif.

Application April 2, 1934, Serial No. 718,657

21 Claims. (Cl. 265—1)

My invention relates to testing devices for brakes for the wheels of automobiles and the like, and an object of the invention is to provide a novel, simple and practical device capable of being quickly and easily applied to and detached from a wheel of any ordinary standard diameter and which device is manually operable to turn the wheel while the respective brake is applied and to automatically and concurrently register the degree of turning force necessary to rotate the wheel against the action of the applied braking power, whereby by the succesive application of my device to the several wheels of the vehicle being tested, the relative braking resistances of the several brakes may be determined, to indicate a variance if any between different braking powers applied to different wheels so that the braking means co-related to such wheels may be adjusted accordingly to render all of the brakes uniform in their braking action.

Another object is to provide novel, simple, and efficient means whereby the force required to turn a wheel against applied braking force may be automatically indicated by the application of the force used to move the wheel against the applied braking force.

The invention resides in the parts and combinations of parts more particularly hereinafter described and pointed out in the claims.

Other objects, advantages, and features of invention may appear from the accompanying drawing, the subjoined detail description and the appended claims.

The accompanying drawing illustrates the invention in a form I at present deem preferable.

Figure 1 is a view showing in side elevation a brake testing device constructed in accordance with my invention in applied position on a wheel of an automobile a fragment of which is shown.

Fig. 2 is an enlarged vertical sectional view taken on line 2—2, Fig. 1, but with the wheel shown in elevation, and the hub cap member moved slightly to the left and the hand bars removed to more clearly disclose the interior construction of the part 5.

Fig. 3 is an enlarged transverse sectional view taken on line 3—3, Fig. 2, and looking in the direction of the arrows.

Fig. 4 is an enlarged detail elevational view of the sleeve of my device with a portion thereof broken away.

My invention in its present embodiment comprises an attaching frame 1 made up of a plurality of rigid arms 2 having portions 15 converging to and cast integral with a member M so that the member is positioned laterally with respect to the frame as a unit. At the extremities of the converging portions 15 of arms 2 are channel portions 16 all of which are disposed in the same plane as will be observed from an inspection of Fig. 2. These channel portions 16 of the arms carry tire gripping elements E, E', and E''. Each tire gripping element includes a linear portion 17 which is channeled as shown in Fig. 3, and a curved portion 18 which is adapted to extend transversely of the tread surface of a tire to constitute a tire or wheel gripping member. The linear portion 17 has a sliding fit within the channel portion 16 of its respective associated stationary arm, and a bolt 19 is extended through a suitable opening 20 in the portion 17 and a slot 21 in the portion 16 whereby, a lengthwise adjustment of the portion 17 on the portion 16 may be effected to vary the radial position of the respective tire gripping element or member. Thus it will be seen that by adjusting the several tire gripping elements relative to the spider and hub 3 of my device it may be adapted for application to wheels of various diameters.

The curved portions 18 of the tire gripping members are each provided on their inner faces with a bead 22 so that when the elements are in tire engaging position the bead 22 will be depressed into the resilient tire 4 of the vehicle 5' to bite into the tread of the tire and thus secure the frame in fixed position circumferentially on the wheel. The element E, as best illustrated in Fig. 2, is likewise capable of radial adjustment upon its corresponding stationary frame arm 16, but its adjustment is not fixed in that it is capable of manual extension to quickly adjust its radial position to facilitate the application of the device to a tire. By reference to Fig. 2 it will be seen that the linear portion 17 is freely slidable in the channel portion 16, and that a spring 23 connected at one end to a rigid handle or hand grip member 24 and at the other end to a web 25 of its associated converging arm portion 15, serves to yieldably urge the gripping element inwardly on the arm 16 and normally urge the tire gripping elements into tire engaging position. The handle 24 is shaped to provide a hand grip member which is adapted to be manually gripped to move the tire gripping element E radially outward to be extended across the tread of a tire following application of the other two tire gripping elements to the tire 4.

The member M comprises a tubular head or hub 26 closed at one end by a wall 27 cast integral with the head 26 and frame arms 2 and is provided with a breather port 28 through which air from the interior of the head can escape and through which air may be admitted to the interior of the head. A sleeve 29 has a press fit or is shrunk on the head 26 so that it is fixed against rotation thereon. The inner end of this sleeve abuts an annular shoulder 30 on the head, and the sleeve is formed at diametrically opposite points with substantially V-shaped cam slots 31. The two diverging arms of each of these slots extend spirally of the sleeve as will be seen from an inspection of Fig. 4.

A hub cap member 5 is rotatable on the hub 26 as well as being longitudinally movable or slidable thereon. The hub cap member 5 is in the form of a cup shaped head having an internal diameter to slidably fit upon the sleeve 29.

A pair of screw threaded sockets 32 are formed at diametrically opposite points on the member 5, and these sockets receive handle bars 33 of suitable length to provide the necessary leverage for operation of my device. The inner end of each socket 32 has threaded therein a bolt or dog nose screw 34 carrying at its inner end a roller 35 which has a rotating fit in either diverging arm of its associated cam slot 31.

As shown in Fig. 2 a guide or bearing sleeve 36 is formed integral with and disposed centrally within the member 5. This sleeve or bearing is provided for the purpose of slidably receiving and guiding a measuring rod 37 in its longitudinal movements through the member 5. The inner end of the rod 37 is adapted to abut against a projection 38 on the inner side of the wall 27 when in the solid line position shown in Fig. 2, and such end is provided with a nut 39 adapted to engage the inner end of the guide sleeve 36 to prevent complete withdrawal of the rod from the member 5. That portion of the rod 37 which is adapted to project from the member 5 is formed with graduations 40 for indicating in degrees the turning force applied to the member 5 as will be more fully hereinafter described.

A coiled compression spring 41 surrounds the rod 37 and the sleeve 36 and is interposed between the wall 27 and a thrust bearing 42 mounted on the inner side of the member 5 the latter serving as a bearing for, and to prevent rotation of, the spring 41. The spring 41 is provided for the purpose of yieldably urging the member 5 outwardly on the sleeve 29 or to the position shown in Fig. 2 and in which position the rollers 35 are disposed at the base of the cam slots 31.

For the purpose of causing the rod 37 to move outwardly with the member 5 following movement of the latter inwardly, a friction device 6 is provided to engage the rod 37. This device, in the present instance, comprises a felt or leather disk 43 positioned at the inner end of a pocket 44 on the member 5 so as to have slidable contact with the rod 37. This disk is pressed into contact with the rod by means of a spring 45 adjustably held within the pocket by means of a screw plug 46.

To apply my brake testing device to any particular wheel of an automobile the gripping elements E, E' and E'' are adjusted to the approximate diameter of the tire of the wheel whereupon, two of the gripping members 18 are applied to the underside of the tire tread so as to extend transversely thereof as illustrated in the drawing. Once these two members have been applied, it is only necessary to grip the handle 24 and pull the extensible gripping member 18 for the element E outwardly against the tension of the spring 23 until such member may be slipped over the tire to occupy the same transverse position as the other members, whereupon the spring 23 will exert a pressure against the clamping arms 18 to frictionally secure such arms 18 to the tire 4 and embed the bead 22 therein to aid in the gripping of the arms 18 to the tire 4. With the gripping elements thus applied, my device is fixedly secured to the vehicle wheel for rotation therewith and in such relation that the members M and 5 are supported at the axial center of the wheel and at the outer side thereof as shown in Figs. 1 and 2.

With my device applied to a wheel as above set forth and with the wheels jacked up so that they are elevated from the ground the next operation in testing the braking action that may be applied to the wheels is to depress the brake pedal of the automobile and then lock it in any suitable manner so that an application of braking power on the wheels is maintained. Once this brake application has been effected, the brake testing device can now be operated in the following manner: With the member 5 in the outer extreme position illustrated in Fig. 2 under the action of the spring 41, such member is manually rotated by the operator gripping the handle bars 33 and forcing them in a clockwise direction as when viewed in Fig. 1, to rotate the wheel in the same direction that it is rotated under forward movement of the vehicle 5'. With manual turning force applied to the member 5 in this manner, the rollers 35 coact with the walls of one arm of each cam slot 31 to cause the member 5 to move spirally inward upon the member M.

During such movement, the spring 41 is compressed until its reaction is built up to set up a resistance equal to the resistance of the brake as offered to turning movement of the wheel. Once this condition is reached the spring acts as a rigid connection between the two members so that further turning of the member 5 will likewise turn the member M and thus turn the wheel. Concurrently with turning of the wheel, the operator releases the handle bars 33, thus permitting the spring 41 to restore the member 5 to its original outer extreme position.

During movement of the member 5 inwardly the rod 37, one end of which is in engagement with projection 38, increases in its degree of projection from the end of the member 5 until movement of the latter ceases. As such inward movement of member 5 ceases with rotation of the vehicle wheel, it will be clear that the degree of projection of the rod from the member 5 is in accordance with movement of the member 5 inwardly on sleeve 29, and thus the degree of projection of the rod indicates through its graduations, the amount of turning force manually applied to the member 5 to effect turning movement of the wheel against the braking action of its applied brake. With restoration of the member 5 to its outer extreme position, the disk 43 serves to carry the rod 37 outwardly with the member as indicated in dash lines in Fig. 3, and in the same projected position which it occupied when the member 5 was in its inner extreme position.

This permits the operator to read the rod graduations, and in this manner accurately determine the braking action of the wheel brake. Once this reading has been taken the operator pushes the rod inward to its normal or non-indicating position, so that with detachment of the device from this particular wheel, it is ready for successive application to the other wheels of the vehicle to test their brakes in a like manner. If there is shown to be a variance in their braking actions, the brakes requiring adjustment may be adjusted accordingly to attain the required uniformity in braking action.

In testing the brake for each wheel, it is necessary that the wheel be rotated in the direction in which it normally turns under forward movement of the vehicle, and by providing the sleeve 29 with the V-shaped cam slots 31, the member 5 may be rotated in either direction on the member 5 to effect rotation of the wheel in the desired direction depending on which wheel of the vehicle my device is applied.

I claim:

1. A brake testing device comprising a support; means for securing the support to a wheel; a member movable in two directions on the support to occupy two extreme positions; means for biasing the member to one extreme position; manually operable means for moving said member toward the other extreme position against the action of said biasing means; means slidable through said member for visibly indicating the degree of movement of the member toward the said other extreme position; and means for releasably securing said indicating means in an indicating position.

2. A brake testing device comprising a pair of tubular members telescoped one over the other; a support for the inner member of the pair having means for fixing it to a wheel; a spring between the members for urging the outer member outwardly on the inner member; cams and coacting rollers on the two members for causing the outer member to move telescopingly of the inner member when a turning force is applied to the outer member, whereby the spring is compressed to increase its reaction; and a rod projecting from the outer member for measuring the distance which the outer member telescopes the inner member.

3. A brake testing device, as embodied in claim 2, wherein the rod abuts the inner member to prevent movement thereof inwardly with the outer member; and means on the outer member engaging the rod to cause the latter to move outwardly with the outer member and to permit said rod to be manually moved inwardly of the outer member.

4. In a brake testing device; a frame having a hub and arms extending radially from said hub and terminating in tire gripping elements, one of said arms being slidably extensible away from said hub in a radial direction; and means cooperating with said extensible arm whereby the extensible arm is normally yieldably urged toward said hub in said radial direction.

5. A brake testing device, as embodied in claim 2, wherein the cams and rollers are correlated to cause the outer member to move spirally along the inner member irrespective of the direction in which a turning force is applied to the outer member.

6. A brake testing device comprising, a frame having radial arms adjustable as to length with one of the arms being extensible and yieldably urged radially inward of the frame; tire gripping elements on the outer ends of the arms; a member fixed to the arms at the center of the frame; a sleeve fixed on the member and having substantially V-shaped cam slots at diametrically opposed points therein; a second member receiving the sleeve; rollers on the second member engaging with said cam slots; sockets on the second member at diametrically opposed points; bars secured in the sockets; an expansible spring between the two members; and a rod abutting the first member and movable in the second member to project therefrom.

7. A brake testing device as embodied in claim 6, wherein a friction device is carried by the second member to engage one end of the rod.

8. In a brake testing device; a hub member; a cap member encircling said hub member; cam means connecting said members whereby rotation of said cap member will force said cap member to telescope said hub member; means to connect said hub member to a vehicle wheel; means normally urging said members into non-telescoping position; and means to indicate the distance said cap member telescopes said hub member.

9. In a brake testing device for wheels, an indicator slidable axially outwardly and inwardly relative to the axis of said wheel; means to connect said indicator to a wheel having a braking means associated therewith so that said indicator extends axially outward from the axis of said wheel; and means cooperating with said indicator to indicate the pressure required to cause a slippage between said wheel and the braking means applied to said wheel, and to maintain such indication after such slippage occurs until said indicating means are manually released.

10. In a brake testing device, a frame adapted for attachment to a wheel; a hub carried by said frame; a cap member carried by said hub; means normally urging said cap and hub apart; an indicator carried by said cap member; and cam means connecting said cap member and said hub whereby rotation of said cap member on said hub will cause said cap to telescope said hub and project said indicator from said cap member.

11. In a brake testing device, a frame adapted for attachment to a wheel; a hub carried by said frame; a cap member carried by said hub; means normally urging said cap and hub apart; an indicator carried by said cap member; cam means connecting said cap member and said hub whereby rotation of said cap member on said hub will cause said cap to telescope said hub and project said indicator from said cap member; and means to frictionally hold said indicator in projected position.

12. In a testing device for a movable element and a brake member associated therewith; a hub member; a cap member encircling said member; means connecting said members whereby rotation of one of said members will force said members to telescope; means to hold the other of said members in a substantially fixed position relative to said movable element; means normally urging said members into non-telescoping position; and means to indicate the distance said members telescope with each other.

13. A brake testing device comprising a hub member and a plurality of arms extending from said member; tire gripping elements extending from said arms, one of said tire gripping elements being slidably mounted relative to its associated arm; means to yieldably urge said last mentioned tire gripping element into tire engaging position; a rotatable member associated with said hub member, said members being adapted to telescope with each other; means normally urging said members in a non-telescoping position; and means for indicating the distance said members telescope with each other when said members are moved to telescope with each other.

14. In a brake testing device, a frame having a hub and radial arms extending therefrom; gripping elements associated with said arms adapted to engage the periphery of a wheel; one of said gripping elements being slidably mounted relative to its associated arm; and means yieldably urging said slidable gripping element radially toward said hub and into wheel engaging position when said gripping elements are in engagement with the periphery of a wheel.

15. A brake testing device, comprising a hub member; tire gripping elements extending from said hub member; a V-shaped cam slot in said hub member; a cap member encircling said hub member; means connecting said cap member with said V-shaped cam slot; resilient means normally urging said members away from each other; manually operable means for rotating said cap member to cause said cap member to telescope with said hub member and against the action of said resilient means whereby the reaction of said resilient means is increased to establish a rigid connection between the hub member and cap member to cause the hub member to rotate with the cap member; and means for indicating the degree of movement of the cap member required to move the hub member.

16. A brake testing device comprising a pair of tubular members telescoped one over the other; a support for the inner member of the pair having means for fixing it to a wheel; a spring between the members for urging the outer member outwardly on the inner member; means on the two members for causing the outer member to move telescopingly of the inner member when a turning force is applied to the outer member, whereby the spring is compressed to increase its reaction; and a rod projecting from the outer member for measuring the distance which the outer member telescopes the inner member.

17. A brake testing device, as embodied in claim 2, wherein the members are correlated to cause the outer member to move spirally along the inner member irrespective of the direction in which a turning force is applied to the outer member.

18. A brake testing device comprising, a frame having radial arms adjustable as to length with one of the arms being extensible and yieldably urged radially inward of the frame; tire gripping elements on the outer ends of the arms; a member fixed to the arms at the center of the frame, said member having V-shaped cam slots at diametrically opposed points therein; a second member receiving the first member; means on the second member engaging with said cam slots; sockets on the second member at diametrically opposed points; bars secured in the sockets; an expansible spring between the two members; and a rod abutting the first member and movable in the second member to project therefrom.

19. In a brake testing device; a hub member; a cap member encircling said hub member for rotational and telescopic connection therewith; means connecting said members whereby rotation of said cap member will force said cap member to telescope said hub member; means to connect said hub member to a vehicle wheel; means normally urging said members into non-telescoping position; and means to indicate the distance said cap member telescopes said hub member.

20. In a brake testing device, a frame adapted for attachment to a wheel; a hub carried by said frame; a cap member carried by said hub; means normally urging said cap and hub apart; an indicator and means connecting said cap member and said hub whereby rotation of said cap member on said hub will cause said cap member to telescope said hub and project said indicator to ascertain the distance said cap member telescopes said hub member.

21. In a brake testing device, a frame adapted for attachment to a wheel; a hub carried by said frame; a cap member carried by said hub; means normally urging said cap and hub apart; an indicator and means connecting said cap member and said hub whereby rotation of said cap member on said hub will cause said cap member to telescope said hub and project said indicator to ascertain the distance said cap member telescopes said hub member; and means to frictionally hold said indicator in projected position.

YERVANT LION.